United States Patent [19]

Reuter et al.

[11] Patent Number: 4,955,588
[45] Date of Patent: Sep. 11, 1990

[54] BEARING FOR THE ELASTIC MOUNTING OF MACHINES, MACHINE PARTS AND/OR VEHICLE PARTS

[75] Inventors: Horst Reuter, Oberbachem; Jörn-Rainer Quast, Bad Bodendorf; Roland Schall, Villip, all of Fed. Rep. of Germany

[73] Assignee: Boge AG, Eitorf, Fed. Rep. of Germany

[21] Appl. No.: 349,005

[22] Filed: May 9, 1989

[30] Foreign Application Priority Data

May 9, 1988 [DE] Fed. Rep. of Germany ....... 3815817

[51] Int. Cl.$^5$ .............................................. F16F 5/00
[52] U.S. Cl. ................................. 267/140.1; 267/219
[58] Field of Search ................. 248/562; 267/140.1 R, 267/140.1 A, 140.1 C, 219; 427/421, 444

[56] References Cited

U.S. PATENT DOCUMENTS

| | | | |
|---|---|---|---|
| 3,713,872 | 1/1973 | Porter, Jr. et al. | 427/421 X |
| 3,839,051 | 10/1974 | Cerveny | 427/421 X |
| 4,730,584 | 3/1988 | Jördens et al. | 267/140.1 A X |

*Primary Examiner*—Duane A. Reger
*Attorney, Agent, or Firm*—Nils H. Ljungman

[57] ABSTRACT

Bearing for the elastic mounting of machines, machine parts and/or vehicle parts in which the rubber body located between the fasteners is designed so that the oxygen in the atmospheric air cannot come in contact with the rubber body. For this purpose the surface of the rubber body facing the atmosphere is covered by a liquid-tight membrane which is impermeable to gas and/or oxygen, and the cavity betwween the rubber body and the membrane is filled with an inert gas and-/or an inert liquid. Alternatively, the surface of the rubber body facing the atmosphere can be coateed with a gas-tight, elastic material.

9 Claims, 2 Drawing Sheets

BEARING FOR THE ELASTIC MOUNTING OF MACHINES, MACHINE PARTS AND/OR VEHICLE PARTS

BACKGROUND OF THE INVENTION

1. Field of the Invention

This invention relates to a bearing for the elastic mounting of machines, machine parts and/or vehicle parts, comprising at least two fasteners and a rubber body located between them.

2. Description of the Prior Art

Prior art bearings, which are used for the elastic mounting of machines and/or machine parts, always include two fasteners and a rubber body located between them. Bearings of this type are almost exclusively designed so that they are exposed to the oxygen in the atmosphere. If such bearings are used, for example, in the engine compartment of a motor vehicle, or near the engine in such a vehicle, they are also exposed to the exhaust heat which, under some circumstances, can be 140 degrees C. or higher. Under such operating conditions, the elastic parts age rapidly.

OBJECT OF THE INVENTION

The object of the invention is to design a bearing so that the oxygen from the atmosphere is kept away from the rubber body.

SUMMARY OF THE INVENTION

To accomplish this object, this invention provides that the surface of the rubber body, of the bearing, facing the atmosphere is sealed against the atmosphere by a thermally stable gas-tight and/or liquid-tight membrane which is insensitive to oxygen, and the cavity between the rubber body and the membrane is filled with an inert gas and/or an inert liquid.

The gas is advantageously nitrogen, argon, carbon dioxide, etc.

An advantage with this embodiment is that the oxygen in the air is kept away from the polymer, so that elastic parts subjected to dynamic stresses work in an inert gas or in an inert liquid, which are enclosed by a thermally stable gas-tight and/or liquid-tight membrane which is insensitive to oxygen.

The object of the invention is alternately accomplished by coating the surface of the rubber body facing the atmosphere with a gas-tight, elastic material.

The material is advantageously vinyl, plastic or rubber. In this embodiment too, it is advantageous that the oxygen in the air is kept away from the polymer.

Both alternative objects guarantee that the function of a high dynamic load absorption capability is decoupled from the heat-stability in the atmospheric oxygen. In this manner, the pronounced dynamic load characteristics of flexible rubber parts can be utilized at significantly higher temperatures.

It is also advantageous that both the membrane and the elastic material are of great advantage in keeping away oils from elastomers which are not resistant to swelling.

One aspect of the invention resides broadly in a hydraulically dampened vibrationally damping rubber engine motor vehicle mounting device at least partially exposed to an ambient gaseous environment which has at least a longitudinal axis along which damping is prevalent, the device has rigid opposite end portions with mounting apparatus thereat, aligned with the longitudinal axis; the device is of the type which includes an elastomeric structure which is attached to the opposite end portions: at least two chambers containing damping fluid are disposed one adjacent another along the longitudinal axis, the at least two chambers are separated by partition apparatus which has an outer, rigid, peripheral portion and an inner, axially movable portion, which has elastic properties, disposed within the outer portion; and sealing device positioned adjacent the elastomeric structure for substantially isolating the elastomeric structure from the ambient gaseous environment, whereby deterioration of the elastomeric structure due to exposure to the ambient gaseous environment is thereby limited.

Another aspect of the invention resides broadly in a resilient bearing for mounting equipment such as machines and parts of machines onto vehicles and the like, the bearing is at least partially exposed to an ambient gaseous environment for elastically connected first and second parts of the equipment comprising: a relatively rigid outer member which has a generally cylindrical interior surface of a predetermined diameter surrounding the inner member with substantial clearance therebetween; an elastomeric body located in the clearance between the inner and outer members and at least partially exposed to the ambient gaseous environment; and sealing device positioned adjacent the elastomeric body for substantially isolating the elastomeric body from the ambient gaseous environment, whereby deterioration of the elastomeric body due to exposure to the ambient gaseous environment is thereby limited.

A further aspect of the invention resides broadly in a resilient bearing for mounting equipment such as machines, and parts of machines onto vehicles and the like at least partially exposed to an ambient gaseous environment the bearing being for elastically connecting first and second parts of the equipment which includes: a first attachment device which is mechanically attached to the first part of the machine: a second attachment device which is mechanically attached to the second part of the machine: a resilient elastomeric connector device which is interposed between the first attachment device and the second attachment device for mechanically and elastically connecting the first attachment device to the second attachment device; and a sealing device positioned adjacent the elastic connector apparatus for substantially isolating the elastic connectors from the ambient environment, whereby deterioration of the elastomeric connector apparatus due to exposure to the ambient environment is thereby limited.

BRIEF DESCRIPTION OF THE DRAWINGS

Preferred embodiments of the invention are schematically illustrated in the accompanying drawings.

DESCRIPTION OF THE PREFERRED EMBODIMENT

Figure 1:
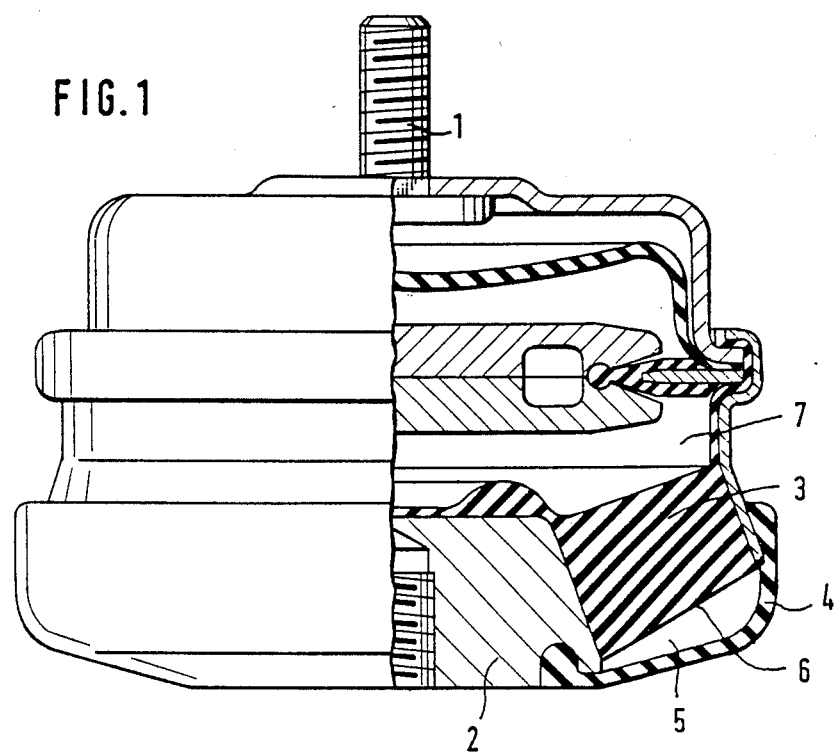
FIG. 1 is a cross section of a hydraulically damping engine mount, with a membrane.

The hydraulically damping engine mount illustrated in FIG. 1 comprises essentially the fastener 1 and, on the opposite side, the fastener 2, whereby between the two fasteners 1 and 2 there is an elastic rubber body 3. The surface 6 of the rubber body 3 is normally exposed to the oxygen in the atmosphere. In this embodiment, there is a membrane 4, whereby the cavity 5 formed by the rubber body 3 and the membrane 4 is filled with an inert gas and/or an inert liquid. The gas can be nitrogen, for example. The oxygen in the atmosphere is kept away from the rubber body 3 by the membrane 4 and the nitrogen in the cavity 5.

Figure 2:
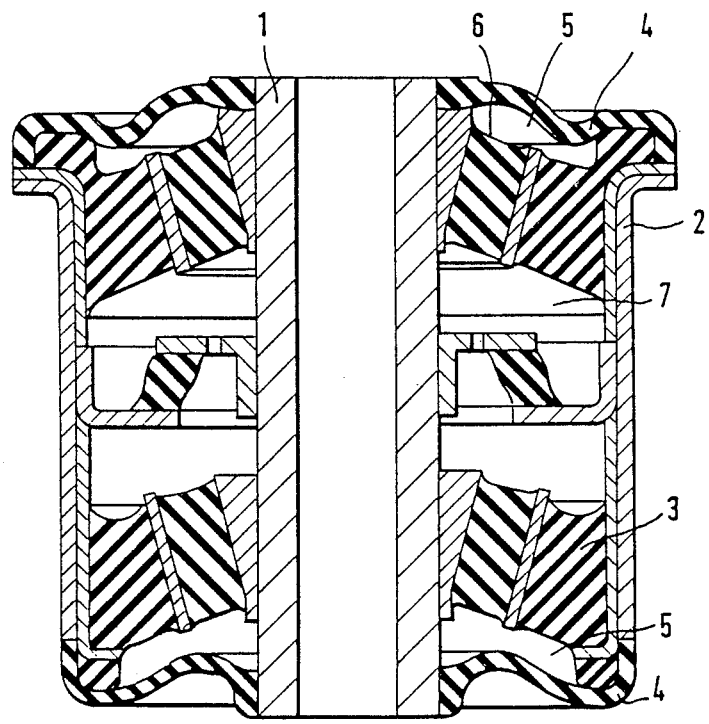
FIG. 2 is a cross section of a bearing which can accept an axial and a radial load, with a membrane.

FIG. 2 shows a bearing which can be stressed axially and radially, in which there is a fastener 1 and a fastener 2, between which there is a rubber body 3. Both end surfaces of the bearing have a membrane 4, whereby the cavity 5 formed by the rubber body and the membrane 4 is filled with an inert gas and/or an inert liquid.

The bearing in FIG. 1 and the bearing in FIG. 2 are each designed as hydraulic bearings, so that the inner chambers 7 are filled with hydraulic damping fluid, and therefore do not have any oxygen which is disadvantageous for the polymer.

Figure 3:
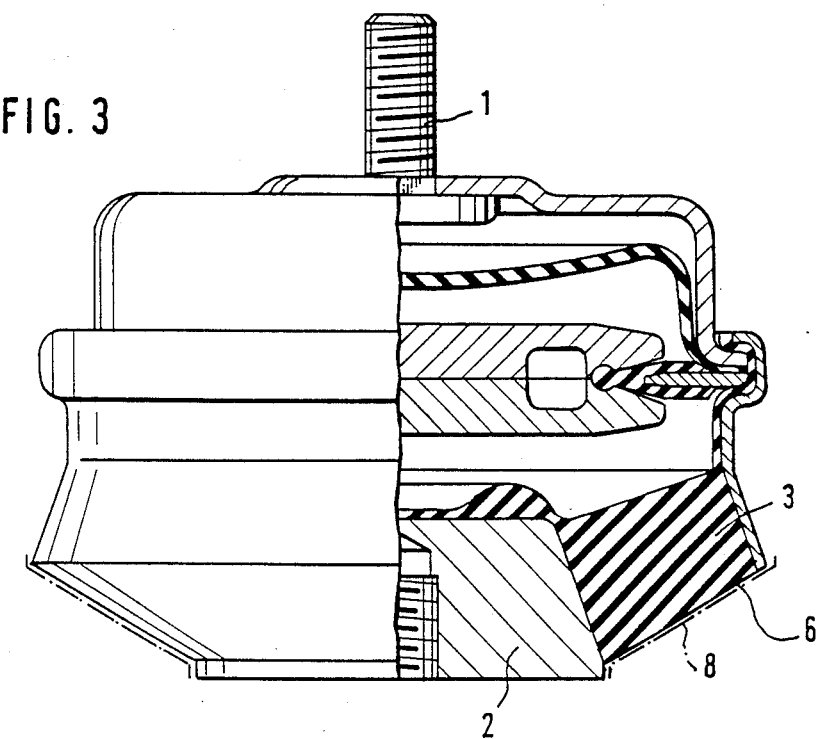
FIG. 3 is a cross section of a hydraulically damping engine mount, in which the rubber body is coated with an elastic, gas-tight material.

FIG. 3 also illustrates a hydraulically damping engine mount, in which the rubber body 3 located between the fastener 1 and the fastener 2 is coated on its surface 6 facing the atmosphere with a gas-tight, elastic material 8. The material is impermeable to gas and is applied to the rubber body 3 without cavities, so that oxygen from the atmosphere cannot come in contact with the rubber body 3.

Figure 4:
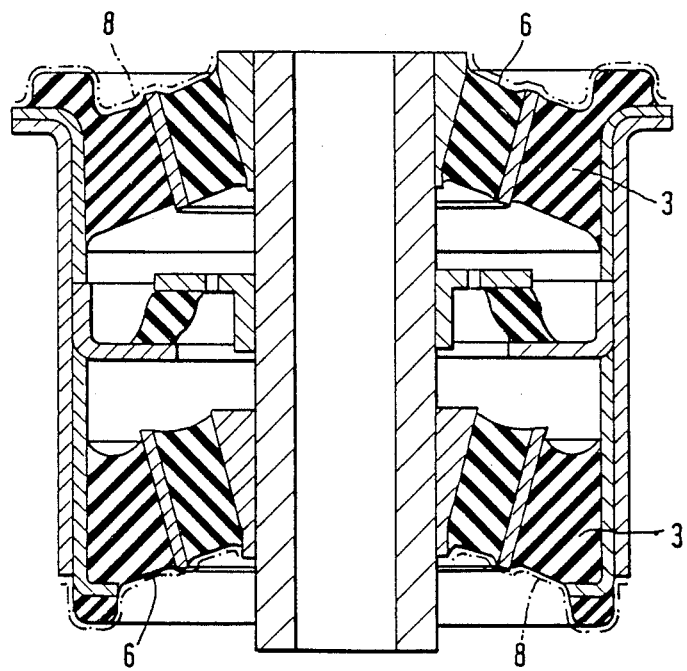
FIG. 4 is a cross section of a bearing which can accept an axial and radial load, with a coating on the rubber body.

FIG. 4 illustrates an example of a bearing which can be stressed in the axial and radial directions, whereby the rubber body 3 is theoretically like the one illustrated in FIG. 3, in which the surface 6 facing the atmosphere is coated with a gas-tight, elastic material. In this manner, the rubber body is decoupled from the oxygen in the atmosphere, so that high dynamic loads and an improved thermal stability can be expected. Among the several factors which determine the aging of rubber and elastic parts, oxygen has by far the most damaging effects. The autocatalytic process is as follows:

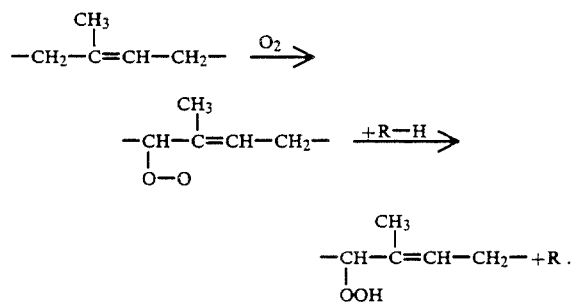

Even small amounts of oxygen bonding to the polymer are sufficient to drastically reduce the physical characteristics and also the service life of an elastic part subjected to dynamic stress.

Other examples of bearings may be found in German Patent No. 30 28 631, German Patent No. 30 50 710, German Laid Open Patent Appln. No. 35 19 016 discloses.

Examples of materials which may be suitable as the elastic material which separates the surface of the body of the bearing from the atmosphere may be found in U.S. Pat. Nos. 4,704,596 entitled "Extension Coated Ignition Wire", 4,700,171 entitled "Ignition Wire", 4,689,601 entitled "Multi-Layer Ignition Wire", 4,514,465 entitled "Storm Window Film Comprising At Least Five Layers." 4,461,795 entitled "Marks For Use In Rubber Articles" and 4,000,140 entitled "Sheet Material". All of the above-mentioned U.S. patents and German patents are incorporated herein by reference as if the texts thereof were fully set forth herein.

In summing up, one aspect of the invention resides in a bearing for the elastic mounting of machines, machine parts and/or vehicle parts, including at least two fasteners and a rubber body located between them, wherein the surface 6 of the rubber body 3 facing the atmosphere is sealed against the atmosphere by a heat-stable, gas-tight, and/or liquid-tight membrane 4 insensitive to oxygen, and the cavity 5 between the rubber body 3 and the membrane 4 is filled with an inert gas and/or an inert liquid.

Another aspect of the invention resides in that the gas is nitrogen, argon, $CO_2$, etc.

Still yet another aspect of the invention resides in that machine and/or vehicle parts include at least two fasteners and a rubber body located between them, wherein the surface 6 of the rubber body 3 facing the atmosphere is coated with a gas-tight, elastic material.

Still yet another aspect of the invention resides in that the material is vinyl, plastic or rubber.

The invention as described hereinabove in the context of a preferred embodiment is not to be taken as limited to all of the provided details thereof, since modifications and variations thereof may be made without departing from the spirit and scope of the invention.

What is claimed is:

1. An elastic bearing for damping vibrations, said elastic bearing being for use in a deleterious ambient environment, said elastic bearing comprising:
    a first attachment member;
    a second attachment member;
    an elastomeric member interposed between said first attachment member and said second attachment member;
    cover member means for sealing at least a portion of said elastomeric member from the deleterious ambient environment;
    said cover member means and said elastomeric element forming a chamber therebetween; and
    a protective fluid disposed in said chamber, said protective fluid comprising at least one of an inert gas and an inert liquid;
    said protective fluid being substantially noneffective in contributing to the damping characteristics of said elastic bearing.

2. An elastic bearing according to claim 1, wherein said protective fluid comprises at least one of nitrogen, argon and carbon dioxide.

3. An elastic bearing according to claim 2, wherein said elastic bearing further comprises an additional first chamber, an additional second chamber, a passageway interconnecting said additional first chamber and said additional second chamber and an additional fluid disposed in at least one of said first and second additional chambers, said additional fluid being distinct, separate from and not in communication with said protective fluid.

4. An elastic bearing according to claim 1, wherein said cover member means comprises a flexible material.

5. An elastic bearing according to claim 2, wherein said cover member means comprises a flexible material.

6. An elastic bearing according to claim 3, wherein said cover member means comprises a flexible material.

7. An elastic bearing for damping vibrations, said elastic bearing being for use in a deleterious ambient environment, said elastic bearing comprising:
   a first attachment member;
   a second attachment member;
   an elastomeric member interposed between said first attachment member and said second attachment member; and
   a protective film sealing at least a portion of said elastomeric element from the deleterious environment;
   said protective film being directly adjacent to and in direct contact with said portion of said elastomeric element.

8. An elastic bearing according to claim 7, wherein said protective film comprises at least one of a vinyl, a plastic and a rubber.

9. An elastic bearing according to claim 8, wherein said elastic bearing additionally comprises a first chamber, a second chamber, a passageway interconnecting said first chamber and said second chamber and a fluid disposed in at least one of said first and second chambers.

* * * * *

UNITED STATES PATENT AND TRADEMARK OFFICE
CERTIFICATE OF CORRECTION

PATENT NO. : 4,955,588

DATED : September 11, 1990

INVENTOR(S) : Horst Reuter ét al

It is certified that error appears in the above-identified patent and that said Letters Patent is hereby corrected as shown below:

On the title page:

In the Abstract

Item [57], on line 8, after the word 'cavity', please delete the word "betwween" and insert the word --between--; and line 11, after the word 'be', please delete the word "coateed" and insert the word --coated--.

Column 2, line 3, after the word 'portions', please delete the punctuation mark ":" and insert the punctuation mark --;--.
        line 41, after the word 'machine', please delete the punctuation mark ":" and insert the punctuation mark --;--.
        line 43, after the word 'machine', please delete the punctuation mark ":" and insert the punctuation mark --;--.

Column 3, line 53, after the last instance of the 'O' a period should be inserted.

Signed and Sealed this

Fourth Day of February, 1992

*Attest:*

HARRY F. MANBECK, JR.

*Attesting Officer*       *Commissioner of Patents and Trademarks*